United States Patent [19]

Worick

[11] 4,178,009

[45] Dec. 11, 1979

[54] MULTI-SECTION IMPLEMENT AND DRAFTING STRUCTURE THEREFOR

[75] Inventor: Richard A. Worick, Beloit, Kans.

[73] Assignee: Sunflower Manufacturing Company, Inc., Beloit, Kans.

[21] Appl. No.: 891,461

[22] Filed: Mar. 29, 1978

[51] Int. Cl.$^2$ .............................................. B60D 1/14
[52] U.S. Cl. ................................ 280/411 A; 172/311
[58] Field of Search ............... 280/411 R, 411 A, 412, 280/413; 172/310, 311, 631

[56] References Cited

U.S. PATENT DOCUMENTS

| 3,033,296 | 5/1962 | Kaufman et al. | 172/310 X |
|---|---|---|---|
| 3,150,722 | 9/1964 | Tromm | 172/310 X |
| 3,337,242 | 8/1967 | Richardson | 280/411 R |
| 3,414,064 | 12/1968 | Foster | 172/311 |
| 3,463,241 | 8/1969 | Essex | 172/311 |
| 3,529,674 | 9/1970 | Todd et al. | 172/311 |
| 3,534,820 | 10/1970 | Groenke | 172/311 X |
| 3,810,660 | 5/1974 | Peterson | 280/411 A |
| 3,935,906 | 2/1976 | Neal et al. | 172/177 |
| 4,023,623 | 5/1977 | Anderson | 172/311 |
| 4,044,842 | 8/1977 | Worick | 172/314 |

*Primary Examiner*—John A. Pekar
*Attorney, Agent, or Firm*—Fishburn, Gold & Litman

[57] ABSTRACT

A drafting structure for a multi-section implement having a plurality of interconnected implement sections arranged abreast to a line of draft includes a pair of spaced draft beams extended generally parallel to the line of draft and a pair of spaced spreader beams extended transversely thereto and forming a generally rectangular rigid frame. The frame is mounted over implement center sections and connected to wing sections thereof by hinges that enable folding of the implement for travel and, which when the implement is unfolded and in its working configuration, disperses and distributes the drafting forces and pressures that tend to cause arching of the center sections. Hitch arms are extended from the frame for connection to a prime mover.

10 Claims, 10 Drawing Figures

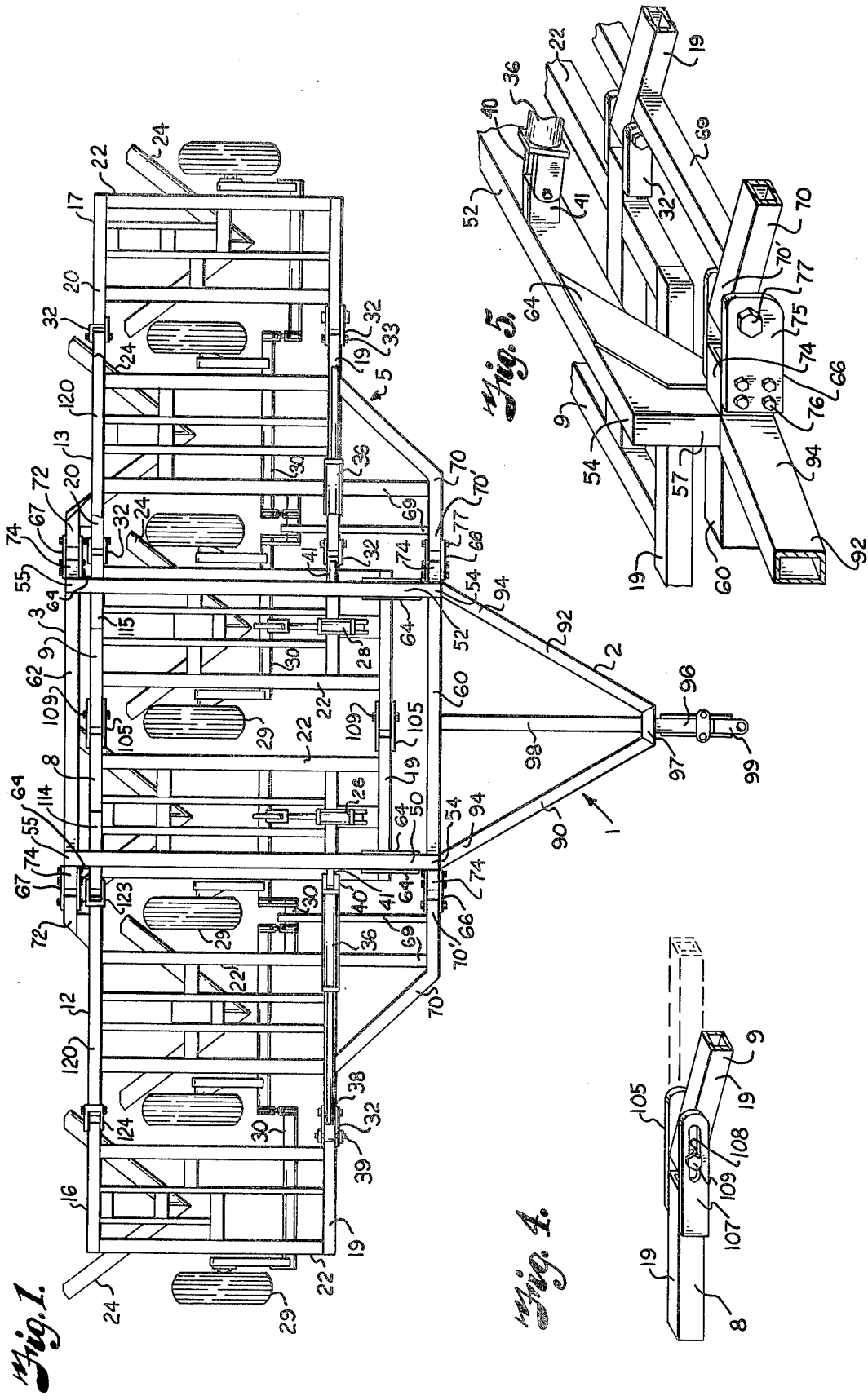

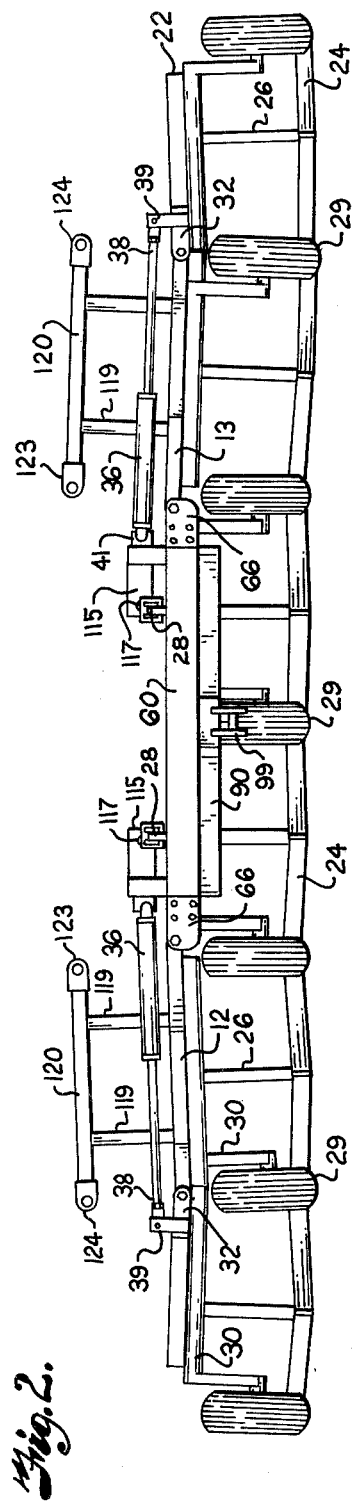
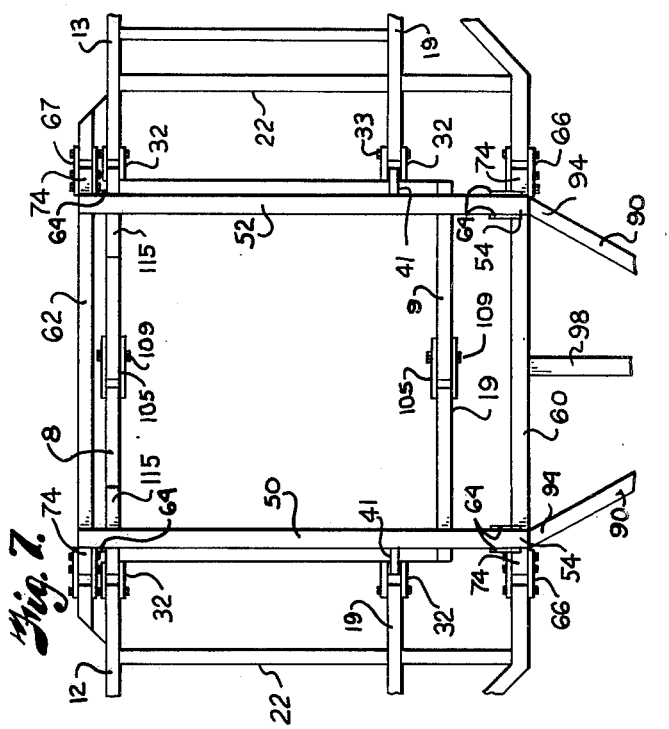
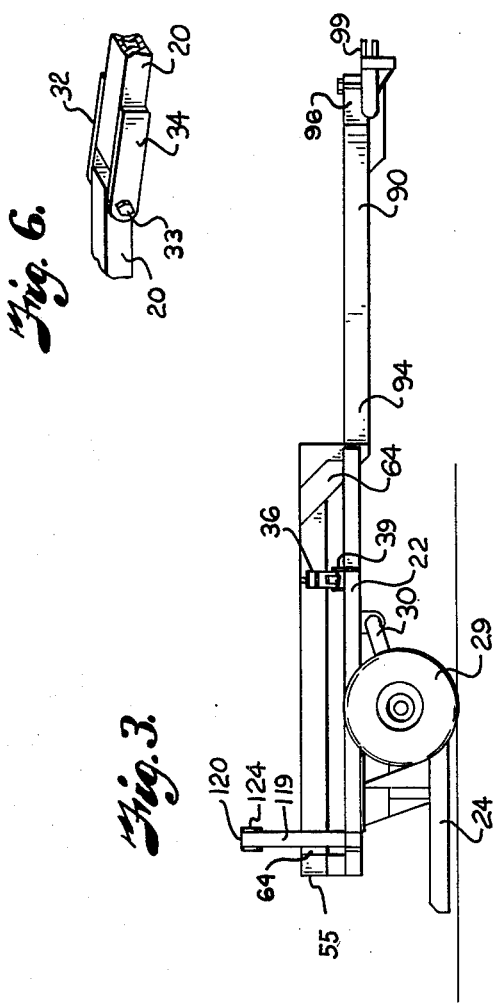
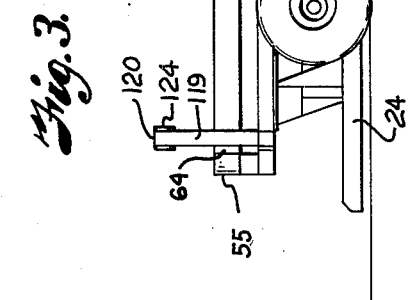

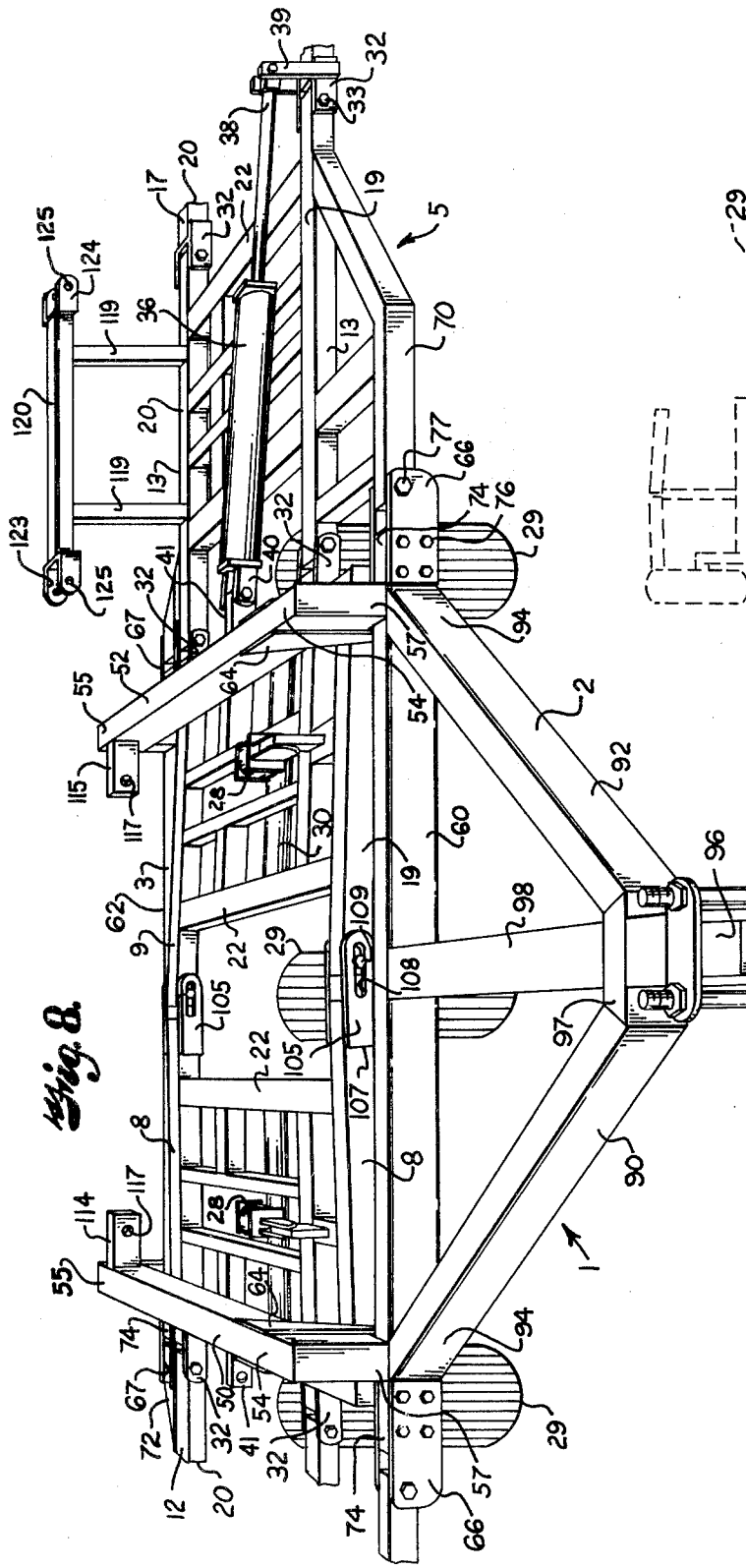
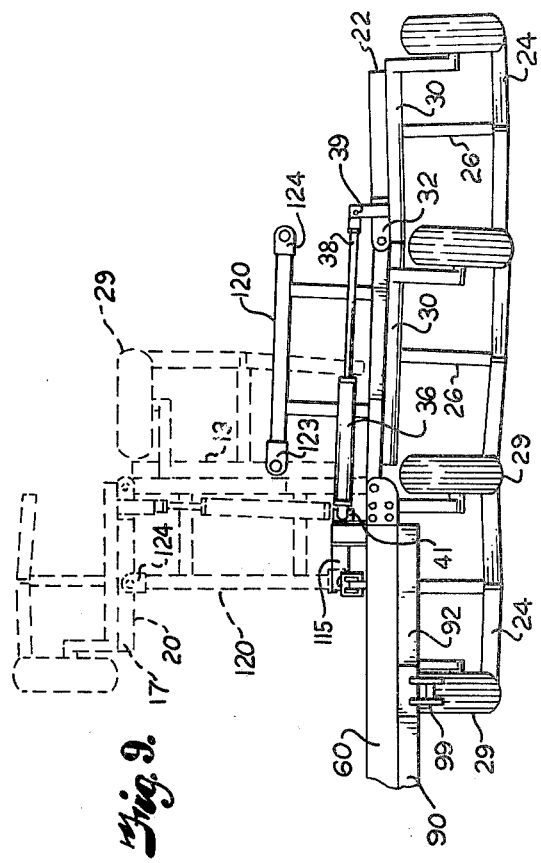

MULTI-SECTION IMPLEMENT AND DRAFTING STRUCTURE THEREFOR

This invention relates to agricultural implements and more particularly to an improved drafting structure for use with multi-section agricultural implements.

With the advent of modern, powerful tractors, agricultural implements have been gauged in sections and arranged side-by-side, or abreast with respect to the line of draft, to permit operation over substantially wider paths with equal or increased speed, thereby reducing the functional time necessary in the field. Of necessity, these sections are hingedly linked together and fold for travel on roads and heretofore have tended to shift or buckle from an initial, ground-conforming configuration to an arched configuration as the implement is drawn. In such structures, the hitch linking the tractor with the implement is typically attached mainly to the central portion or section thereof and resistance met by earthworking members thereof when the implement is drawn produces an inward or gathering force tending to buckle or arch the center sections relative to the outer sections. This, of course, causes the ground to be worked in an non-uniform fashion and requires that the operator periodically raise the implement from earthworking relation and permit the arched center sections to subside and the implement to regain its desired shape.

Attempts have been made to counteract the arching forces by employing a frame structure having pivotal mounting means positioned adjacent to the center section acting as fulcrums to force the center section downwardly upon concurrent upward movement of the outer sections and thereby overcome arching action. These prior art attempts to control buckling are largely unsatisfactory because of the necessity for rather frequent adjustments of the mounting means and because of variations in the resistance of the earth as the earthworking tools move therethrough which tend to bounce and buckle the implement without applying the relatively steady forces needed to counteract arching movements using the above arrangement.

By the practice of this invention, side-by-side multi-section implements of either an odd or an even number of sections are permitted to flex vertically without tending to create an undesirable arched configuration in the center sections. This is accomplished by the use of a rigid, generally rectangular frame substantially spanning and overlying the center sections and connected to wing sections thereof, thereby dispersing and distributing arching forces to a separate drafting frame and not to the center sections.

The principal objects of the present invention are: to provide a drafting structure for a multi-section implement of either an odd or an even number of sections which will prevent arching thereof and allow the sections of the implement to assume a normal ground conforming attitude; to provide such a drafting structure by which laterally positioned independent frame sections are maintained in desirable relationship with each other without interferring with the independent flexibility necessary for following ground contours; to provide such a drafting structure which allows the independent frame sections to be pulled with balanced draft; to provide such a drafting structure which may be easily disassembled and removed, thereby permitting maintainance on implement frame sections connected thereby; and to provide such a drafting structure which is relatively simple and inexpensive in construction, long-lived, and extremely well adapted for its intended purpose.

Other objects and advantages of this invention will become apparent from the following description taken in connection with the accompanying drawings wherein are set forth by way of illustration and example certain embodiments of this invention.

FIG. 1 is an overall plan view illustrating a six-section earth tillage implement having a drafting structure embodying this invention.

FIG. 2 is a front elevational view of the implement and drafting structure therefor.

FIG. 3 is a side elevational view of the implement and drafting structure therefor.

FIG. 4 is an enlarged, fragmentary, perspective view showing details of a sliding hinge connecting center sections together.

FIG. 5 is an enlarged, fragmentary, perspective view of a portion of the drafting structure and showing hinges connecting the structure to wing sections.

FIG. 6 is an enlarged, fragmentary, perspective view showing details of a hinge used for connecting the drafting structure to the wing sections and for connecting certain sections together.

FIG. 7 is a fragmentary, plan view of the drafting structure and implement frame sections, having details thereof removed for the purposes of clarity.

FIG. 8 is a fragmentary, front perspective view of the drafting structure and multi-section implement showing details thereof.

FIG. 9 is a fragmentary, front elevational view showing folding relations of the implement frame sections.

Figure 10:
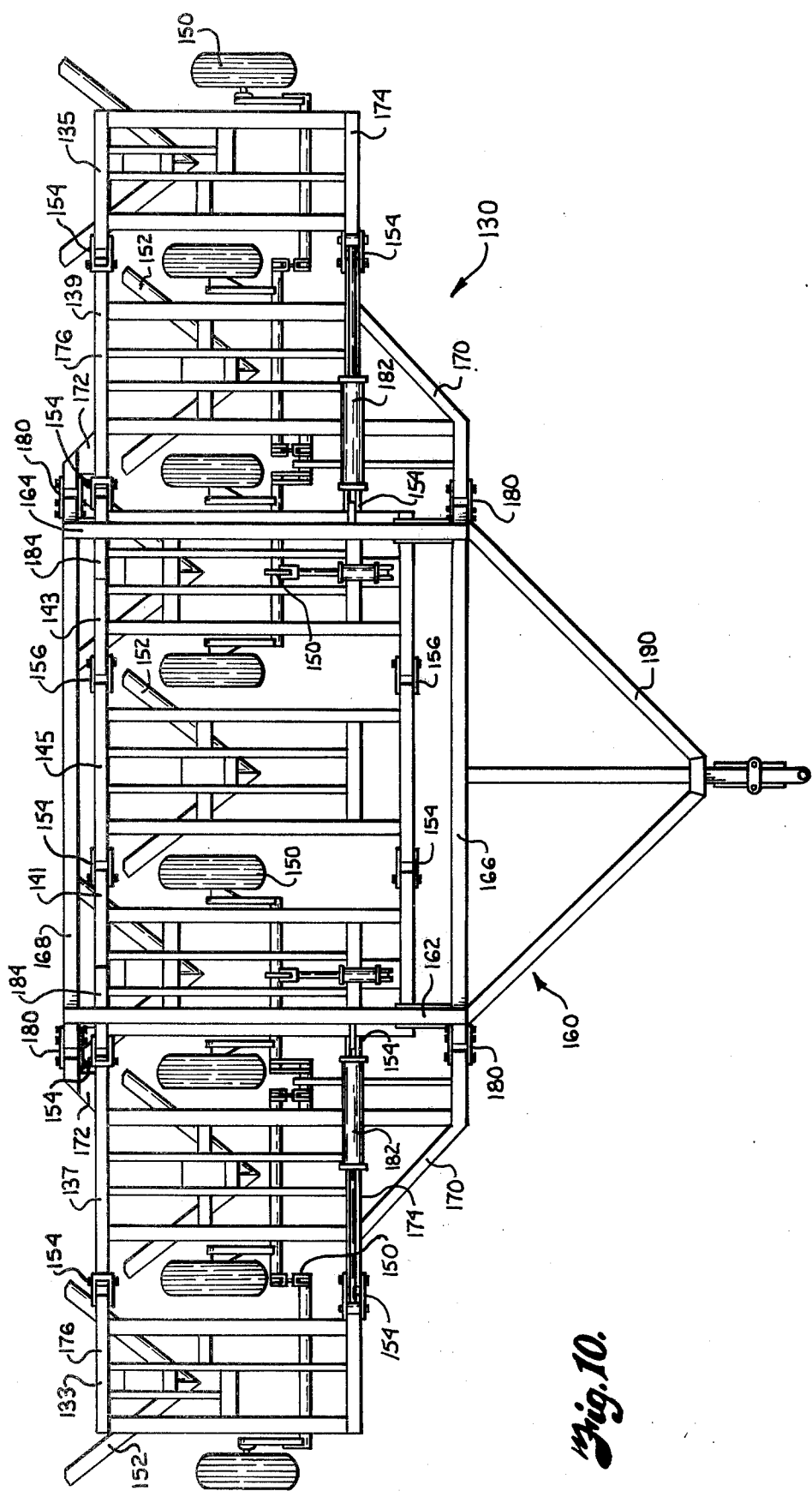
FIG. 10 is a plan view of an implement having an odd number of sections and having the drafting structure connected thereto.

Referring to the drawings in more detail:

The reference numeral 1 generally indicates a drafting structure embodying this invention. The structure 1 comprises a tongue or hitch 2 and a rigid, generally rectangular frame 3 mounted over portions of a multi-section earthworking implement 5 of generally conventional construction.

In the illustrated example, the multi-section implement 5 is comprised of a plurality of substantially bilaterally symmetrical, identical sections including a pair of left and right center sections 8 and 9, left and right inner wing sections 12 and 13, and left and right outer wing sections 16 and 17. Each section has a pair of front and rear transverse frame members 19 and 20 connected to several cross-beams 22. Earth-engaging members, such as cutters 24, are secured to standards 26 affixed to the cross-beams 22. A plurality of wheels 29 and hingedly interconnected wheel-retaining structures 30 adapted for folding of the implement 5 are connected to the sections. Additionally, a means 28, such as a hydraulic piston and cylinder structure is connected to the wheel-retaining assemblies 30 to control the depth of earthworking.

The multi-section implement 5 is provided with means for folding and unfolding the wing sections 12, 13, 16 and 17 relative to the center sections 8 and 9, FIG. 9 for travel to and from the working site. The outer wing sections 16 and 17 are connected to the inner wing sections 12 and 13, which are in turn connected to the center sections 8 and 9, by hinges 32 extended between the respective front and rear frame members 19 and 20 of each section. Each hinge 32 is comprised of a pin 33 and a clevis 34 and collectively provide an axis of vertical rotation for each wing section 12, 13 16, and 17 parallel to the longitudinal axis of the implement 5 for folding of the wing sections. A pair of motive means for folding of the sections such as hydraulic piston and cylinder assemblies 36, are coupled between the sections to be folded relative to the center sections 8 and 9. In the illustrated example, piston free ends 38 are pivotally connected to the outer wings 16 and 17 by pin and clevis assemblies 39 extended upwardly from the hinges 32 connecting adjoining front frame members 19 between the paired inner and outer wing sections 12 and 16 and 13 and 17. Cylinder free ends 40 are pivotally connected to pin and arm mounts 41 positioned on the frame 3 as described below.

The drafting structure 1 includes a pair of spaced, horizontal, draft beams 50 and 52 mounted in overlying relationship to the left and right center sections 8 and 9. The draft beams 50 and 52 have respective front and rear ends 54 and 55 with arms 57, FIG. 5, secured normally thereto and which project downwardly toward the center sections 8 and 9. The arms 57 terminate at a level corresponding to the thickness of the respective front or rear frame member 19 or 20 plus a slight vertical distance for separation between the draft beams 50 and 52 and the center sections 8 and 9. A pair of spaced, front and rear spreader beams 60 and 62 are secured to the ends of the respective arms 57 and extend transversely to the draft beams 50 and 52 to form a rigid rectangular frame 3 which substantially spans and overlies the center sections 8 and 9 and which has front and rear spreader beams 60 and 62 at approximately the same level as the front and rear frame members 19 and 20. Strengthening and stiffening members, such as plates 64, are secured between the respective ends 54 and 55 and the attached spreader beams 60 and 62 for providing additional rigidity.

The frame 3 is hingedly connected to those implement wing sections, for instance inner wing sections 12 and 13, adjacent the center sections 8 and 9 so that the rear spreader beam 62 spans at least one section hinge and by this configuration, disperses and distributes the drafting forces outwardly of the center sections to equalize the forces applied to the hingedly interconnected sections. Particularly, the rear spacer beam 62 is connected to the rear ends 55 of the draft beans 50 and 52 and, when the frame 3 is mounted to the rear frame members 20, positively prevents gathering forces building under draft in the wing section 12, 13, 16, and 17 from transferring to the center sections 8 and 9 and causing arching thereof. This principal applies to multi-section implements having either an odd or an even number of center sections; in either instance, the wing sections are prevented from gathering inwardly by the rigid frame 3.

Front and rear hinges 66 and 67 having a pin 77 and a clevis 75 connect the frame 3 to the inner sections 12 and 13 in front to rear alignment with the hinges 32 and provide an upward axis of rotation for folding the wing sections 12, 13, 16 and 17 relative to the frame 3. Front hinge brackets 70 and 66 provide mounting structure for the hinges and are secured to the respective inner wing sections 12 and 13. Each bracket 70 is formed of beams 71 extended horizontally outwardly from the front frame members 19 and parallelly toward the front spreader beam 60. In the illustrated example, members 69 extend between the beams 71 and the front frame members 19 to provide strengthening support and rigidity. Similar hinge brackets 72 provide mounting stucture for the rear hinges 67 and extend from the rear frame members 20 of the inner wing sections 8 and 9 and are comprised of beams 73 extended horizontally outwardly from the rear frame members 20 and parallely toward the rear spreader beam 62. The front and rear hinge brackets 70 and 72 terminate in respective ends 70' and 72' that are in spaced, end-to-end relation with respective ends 74 of the spreader beams 60 and 62 which extend slightly beyond the connection margins of the arms 57. Clevises 75 of the front and rear hinges 66 and 67 are longitudinally aligned and secured using suitable fasteners, such as bolts 76, to the spreader beam ends 74. The clevises 75 are in turn pivotally connected by pins 77 to the hinge bracket ends 70' and 72' to provide rotation of the sections 12, 13, 16, and 17 as described above. Additionally, the connection made by hinges 66 and 67 provides a space, or vertical separation, between the center sections 8 and 9 and the bottom of the draft beams 50 and 52 for relative vertical movement thereof as the implement is drawn over undulating ground surfaces.

The hitch 2 is rigidly connected to the front spreader beam 60 adjacent the front ends 54 of the draft beams 50 and 52. The hitch 2 includes a pair of hitch arms 90 and 92 having respective rearward ends 94 secured to the spreader beam 60 as by welding or the like. Arms 90 and 92 converge toward a front end 96 of a hitch arm 98 extended perpendicularly from the midportion of the front spreader beam 60 and are joined with the arm 98, by a connector structure 97. The front end 96 extends through the connector structure 92 and is connected to a hitch clevis 99 adapted for attachment to the hitch means of a prime mover (not shown).

It will be obvious that the left and right center sections 8 and 9 do not connect directly to the frame 3 but are connected directly to the left and right inner sections 12 and 13, which in turn are connected to the frame 3 by means of the spaced front and rear hinges 66 and 67. Therefore, those gathering pressures arising in the wing sections 12, 13 16, and 17 are communicated to the frame 3 and not allowed to transfer to the two center sections 8 and 9. Preferably, the frame 3 is substantially equal in width to the combined width of the center sections such as present and substantially spans and overlies the same, thereby inhibiting upward buckling or arching movement because the gathering forces are sufficiently resisted.

Additionally, for those circumstances where large amounts of vertical movement occur in the center sections 8 and 9 relative to each other, as where, for example, rocks, stumps or unusually resistant earth are encountered, the center sections 8 and 9 are connected to each other by means tending to prevent overiding and binding of the sections. Preferably, the center sections 8 and 9 include sliding hinges 105 extending between the respective front and rear frame members 19 and 20. Each sliding hinge 105, FIG. 4, is comprised of a clevis 107 having an elongated slot 108 through which a pin 109 connected to the end of the front frame member 19 is extended, thereby providing an axis of upward rotation parallel to the longitudinal axis of the implement 5 and providing horizontal sliding movement.

It may be desired for structural reasons to connect the drafting frame and hitch assembly 1 to an implement having an even number of sections and having the draft beams 50 and 52 pivotally connected directly to the front and rear frame beams 19 and 20 (not shown) and using at least a rear spreader beam 62 but without the use of the front and rear brackets 70 and 172 as illustrated. In this instance, the use of sliding hinges 105, FIG. 5, between respective front and rear frame beams 19 and 20 between the innermost sections is preferred to permit the innermost sections to function in flexure. Still, gathering forces would not cause arching of the center sections as such forces are resisted by at least the rear spreader beam 62.

To facilitate folding of the multi-section implement 5, the piston and cylinder assemblies 36 are pivotally connected to the pin and arm mounts 41, described above, adjacent the front ends 54 of the draft beams 50 and 52. To provide support for the implement 5 when folded, a pair of support arms 114 and 115 are connected to the draft beams 50 and 52 adjacent the rear ends 55 thereof and have bores 117 extended transversely therethrough through which a pin (not shown) may be inserted. Horizontal fold support beams 120 extend upwardly from the adjoining inner sections 12 and 13 and are vertically spaced therefrom by standards 119 extended normally to the rear frame members 20. The fold support beams 120 have opposite ends connected to clevises 123 and 124 which extend longitudinally therefrom and respectively engage the support arm 114 and 115 and the rear frame members 20 on each outer section 16 and 17. Bores 125 through the clevises 123 and 124 permit pinning thereof to the arm bore 117 and a bore (not shown) in the rear frame member 20 for extended transport.

During folding operations, the outer wing sections 16 and 17 are first folded to a vertical position so that the outer wing sections 16 and 17 are normal to the inner wing sections 12 and 13 and the clevises 124 engage the rear frame members 20 of the outer sections 16 and 17. Next, as illustrated in FIG. 9, the outer wing sections 16 and 17 and the inner wing sections 12 and 13 are folded normal to the center sections 8 and 9 so that the outer wing sections 16 and 17 are parallel to and spaced from the center sections 8 and 9. Concurrently, the clevises 123 engage the support arms 114 and 115 to support the outer wing sections 16 and 17 on the draft beams 50 and 52, thereby preparing the multi-section implement for transportation on roads and through fence gates, and the like.

Unfolding operations are accomplished by reversing the above procedure, whereupon the outer wing sections 16 and 17 and the inner wing sections 12 and 13 rotate downwardly and parallel to the longitudinal axis of the implements 32, 66, and 67. When unfolded, the hinges 32, 66, and 67 provide compensation for following and working uneven terrain. Rotational gathering moments are resisted by the connection of the inner wing sections 12 and 13 to the frame 3, thereby positively preventing arching or buckling of the center sections 8 and 9. The hinge connections of the sections 8, 9, 12 and 13, and 16 and 17 allow substantial relative flexing within the limits permitted by the restricting influences of the hinges 32, 66, and 67. Concurrently, horizontal and vertical movements are permitted by the sliding hinges 105 connecting the center sections 8 and 9 together to smoothly function during tillage operations.

The drafting structure 1, FIGS. 1-9, can easily be adapted for use with an implement having an odd number of sections, such as a seven section implement 130, FIG. 10. The exemplary seven section implement 130 includes left and right outer wing sections 133 and 135, left and right inner wing sections 137 and 139, and a three section central grouping comprising left and right center sections 141 and 143 and a middle center section 145. The sections carry wheel assemblies and gauging structures 150 and earthworking tools 152 as described above in connection with like structure carried by the even-sectioned implement, FIGS. 1-9. The respective sections 133, 135, 137, and 139 are rotatably connected for folding operation and for following uneven terrain by suitable hinges 154, such as described in connection with hinges 32, FIGS. 1-9. Additionally, the hinges 154 connect the left center section 141 to the middle center section 145. To permit horizontal and vertical movement of the center sections 141, 143, and 145 relative to each other, sections 143 and 145 are connected to each other by sliding hinges 156, such as described in connection with FIG. 5.

A modified drafting structure 160 substantially overlies the three center sections 141, 143, and 145 and is connected directly to the left and right inner wing sections 137 and 138 to disperse drafting pressures arising in the left wing sections 137 and 141 and the right wing sections 135 and 139 and to resist arching of the center sections 141, 143, and 145. Spaced horizontal draft beams 162 and 164 are aligned with the direction of draft and have downturned ends (not shown), to which are normally connected spaced, horizontal, front and rear spreader beams 166 and 168 to comprise a rigid, rectangular frame. Front and rear hinge brackets 170 and 172 are connected to front and rear frame members 174 and 176 and extend toward the ends of the respective spreader beams 166 and 168, terminating in front to rear alignment with the hinges 32 between the respective left and right inner wing sections 137 and 139 and the left and right center sections 141 and 143. Hinges 180 connect the front and rear hinge brackets 170 and 172 and the ends of the front and rear spreader beams 166 and 168 and permit upward rotation of the wing sections 133, 135, 137, and 130 fro folding and articulation thereof as described in connection with FIGS. 1-9. Similarly, the modified drafting structure 160 includes mounting portions for motive means 182 and engagement arms 184 for supporting the wings when folded. Additionally, a hitch 190 is connected to the modified drafting structure 160 and includes portions for attachment to complimentary members of a prime member.

In operation, the modified drafting structure 160 resists the inward rotational gathering pressures developed by the wings of the odd-sectioned implement 130 and thereby inhibits arching of the center sections 141, 143, and 145 spanned by the draft beams 162 and 164 and the spreader beams 166 and 168. Additionally, the hinges 154, 156, and 180 permit substantial relative flexing of the sections 133, 135, 137, 139, 141, 143, and 145 for conforming to uneven terrain and permitting folding thereof for transport from field to field.

It is to be understood that while certain forms of this invention have been illustrated and described, it is not to be limited thereto except insofar as such limitations are included in the following claims.

What is claimed and desired to secure by Letters Patent is:

1. For use with a multi-section implement having a plurality of interconnected tool-carrying sections each having front and rear beams and arranged abreast to a line of draft and including at least one center section and adjoining wing sections connected by intersection hinges to said center section for flexing over ground contours and folding said wing sections relative to said center section and generally transverse to the line of draft, a drafting structure comprising:
 (a) a rigid frame of spaced draft beams each having front and rear ends and at least one spreader beam extended transversely to said draft beams and connected thereto near said rear ends;
 (b) said draft beams extending generally over said center section with said draft beams aligned generally longitudinally to the line of draft and having hinge means swingably mounting said frame to said wing sections for folding thereof at least near said rear ends of said draft beams and spanning said intersection hinges for resisting inward gathering forces causing arching of said center section with respect to said wing sections; and
 (c) hitch means for connecting said draft beams to a drawing vehicle.

2. The drafting structure set forth in claim 1 wherein:
 (a) said draft beams are parallelly arranged; and including
 (b) a pair of spaced parallel spreader beams connected to said draft beams at said front and rear ends.

3. The drafting structure set forth in claim 1 including:
 (a) at least two said center sections.

4. The drafting structure set forth in claim 3 including:
 (a) coupling means connecting said center sections in side-by-side arrangement and including a sliding hinge structure permitting vertical and horizontal relative movement of said center sections.

5. The drafting structure set forth in claim 1 wherein:
 (a) said draft beams are connected to said wing sections respective front and rear beams by hinge structures providing an axis of upward rotation parallel to a longitudinal axis of said implement.

6. The drafting structure set forth in claim 5 wherein:
 (a) said hinge structure includes four such hinge structures.

7. The drafting structure set forth in claim 6 including:
 (a) motive means connected to said draft beams for folding said wing sections relative to said center section.

8. The drafting structure set forth in claim 7 wherein:
 (a) said motive means includes a pair of hydraulically actuated piston and cylinder assemblies respectively connected to said draft beams and said adjoining wing sections.

9. The drafting structure set forth in claim 8 including:
 (a) engagement portions connected to said draft beams; and
 (b) fold support brackets positioned on standards extended from said wing sections, said fold support brackets being engageable with said engagement portions for supporting said wing sections by said draft beams when folded.

10. A multi-section implement and drafting structure therefor comprising:
 (a) a plurality of interconnected side-by-side implement sections arranged abreast to a line of draft, said sections including at least two center sections interconnected by center section sliding hinges permitting vertical and horizontal relative movement of said center sections and at least two adjoining wing sections hingedly connected to said center sections and providing an axis of generally upward folding transverse of the line of draft;
 (b) a rigid frame having a pair of spaced draft beams and a pair of front and rear spaced spreader beams, said draft beams being extended generally parallel to the line of draft and having front and rear ends, and said spreader beams being extended generally transversely to the line of draft and rigidly connected to said draft beams;
 (c) said frame being positioned over said center sections and having hinge means swingably mounting said frame to said wing sections and providing an axis of generally upward rotation for said wing sections transverse of the line of draft, said rear spreader beam positioned for spanning at least one center section sliding hinge and resisting inward pulling of said wing sections toward said center sections during drawing of said implement and arching of said center sections about said center section sliding hinge; and
 (d) a hitch connected to said frame and including means for coupling same to a drawing vehicle.

* * * * *